United States Patent
Lin et al.

(10) Patent No.: US 9,666,073 B1
(45) Date of Patent: May 30, 2017

(54) INNOVATED SMART PARKING ASSISTANCE SYSTEM AND INFORMATION SYSTEM

(71) Applicant: Paking Technology, Inc., Taipei (TW)

(72) Inventors: Chih-Hung Lin, Taipei (TW); Hong-Ming Huang, Taipei (TW)

(73) Assignee: PAKING TECHNOLOGY, INC., Taipei (TW)

( * ) Notice: Subject to any disclaimer, the term of this patent is extended or adjusted under 35 U.S.C. 154(b) by 0 days.

(21) Appl. No.: 15/264,546

(22) Filed: Sep. 13, 2016

(30) Foreign Application Priority Data

Mar. 8, 2016 (TW) .............................. 105107102 A

(51) Int. Cl.
G08G 1/14 (2006.01)
G08G 1/065 (2006.01)

(52) U.S. Cl.
CPC ............. *G08G 1/141* (2013.01); *G08G 1/146* (2013.01)

(58) Field of Classification Search
CPC .................................................... G08G 1/141
See application file for complete search history.

(56) References Cited

U.S. PATENT DOCUMENTS

| 2006/0220911 A1* | 10/2006 | Jaupitre | G08G 1/14 340/932.2 |
| 2010/0274693 A1* | 10/2010 | Bause | G06Q 20/32 705/32 |
| 2011/0106425 A1* | 5/2011 | Trum | G01C 21/3476 701/533 |
| 2013/0132102 A1* | 5/2013 | Andrade | G06Q 50/30 705/1.1 |
| 2015/0130638 A1* | 5/2015 | Bahgat | G08G 1/146 340/932.2 |

* cited by examiner

*Primary Examiner* — Joseph Feild
*Assistant Examiner* — Pameshanand Mahase
(74) *Attorney, Agent, or Firm* — Chun-Ming Shih

(57) ABSTRACT

An innovated SMART Parking System, PRIN System and an Information System are provided. The PRIN System is able to manage multiple parking lots without range limitation, and deeply monitor the individual parking space status and also driveway status at each parking lot upon the control devices deployed. By the bi-directional communication, the control devices are able to be managed and changed the control methodology for dynamic parking service support. Besides, the Information System can provide the real-time parking service information for either remote or local access to assist the quick parking without spending too much driving and searching time for parking. Therefore, the PRIN System and Information System facilitates the problem solving of traffic jam and difficult parking within the city effectively, and significantly reduce the social cost, vehicle emission and carbon monoxide to improve the air we breathe and city environment we care.

16 Claims, 5 Drawing Sheets

INNOVATED SMART PARKING ASSISTANCE SYSTEM AND INFORMATION SYSTEM

CROSS-REFERENCE TO RELATED APPLICATIONS

This application claims the priority of Republic of China Patent Application No. 105107102 filed on Mar. 8, 2016, in the State Intellectual Property Office of the R.O.C., the disclosure of which is incorporated herein by reference.

BACKGROUND OF THE INVENTION

Field of the Invention

The invention relates to management technologies, and more particularly, to an innovated smart parking assistance system for use in parking lots and to an information system for bi-directional communication therewith.

Descriptions of the Related Art

As there are getting more and more vehicles in the city, it becomes harder for people when driving out to find parking spaces. In order to solve the problems of traffic jam and difficulty in parking, more and more large parking lots are built in the city. How to manage the parking lots for efficient parking guidance is thus a big challenge.

Most of current parking assistance systems used in the parking lots can merely prompt drivers about if there is a parking space available or how many parking spaces are available. They however cannot guide the drivers to the available parking spaces quickly in the parking lots, and the information prompted by the systems is not updated real time.

Moreover, even if a current parking guiding system of a parking lot may allow a driver when arriving in the parking lot to know locations of the available parking spaces, this service is not applicable to getting precise locations of available parking spaces in a remote parking lot or on different parking lot levels, nor applicable to reserving the parking spaces. The parking guiding system cannot provide dynamic information of vehicles running in the parking lot either. A proper prompt of the vehicle movement dynamic information should compensate the lack of the current parking guiding system. Particularly, if the guiding system informs the driver of having two available parking spaces in area A of the parking lot but is not able to show him/her there are two vehicles being moving towards area A in the meantime (this means area A is going to be full and not having free parking spaces), and then if the driver stills goes to area A, he/she would only waste time and fuel instead of getting a parking space. Thus, the current guiding system of the parking lot may easily cause guiding mistakes and cannot effectively help the driver find an available parking space, and even undesirably leads to increase in parking time for the driver and air pollution in the parking lot.

Therefore, how to provide an innovated smart parking guiding system for parking lots in the city in order to improve parking efficiency for vehicles and reduce social costs is an important topic in the art.

SUMMARY OF THE INVENTION

In view of the above drawbacks of the prior art, a primary object of the invention is to provide a smart parking assistance system and an information system for bi-directional communication therewith, which may simultaneously provide parking space monitoring information and driveway monitoring information to assist drivers to find parking spaces in the city and improve accuracy of guiding the drivers to available parking spaces in a parking lot, such that time for vehicles moving in and out of the parking lot is shortened so as to prevent vehicles from time-ineffectively running in the parking lot and causing traffic jam, and gas exhaust and carbon monoxide emission are also reduced thereby in favor of environmental protection.

Another object of the invention is to provide a smart parking assistance system and an information system for bi-directional communication therewith, which may provide information of movement tracks of vehicles in a parking lot, predict a future usage status of the parking lot, and allow reservation of parking spaces.

Another object of the invention is to provide a smart parking assistance system and an information system for bi-directional communication therewith, which may provide vehicle finding service so as to allow drivers to quickly find their vehicles in a parking lot such that the drivers can leave the parking lot quickly.

To achieve above object and other object, the invention is to provide a parking assistance system applicable in a plurality of parking lots, each of the parking lots having one or more driveways and a plurality of parking spaces, for each of the parking lots the parking assistance system including: a plurality of parking space monitors for respectively monitoring usage statuses of the parking spaces in the parking lot, and generating and outputting parking space monitoring information according to the monitored usage statuses of the parking spaces; a plurality of driveway monitors for respectively monitoring movement dynamics of vehicles on the driveways in the parking lot, and generating and outputting driveway monitoring information according to the monitored movement dynamics of vehicles; at least one parking lot central control device for bi-directional communication with the parking space monitors and the driveway monitors in the parking lot in a wired or wireless way, for transmitting first control signals to the parking space monitors in the parking lot to control operations of the parking space monitors, and for transmitting second control signals to the driveway monitors in the parking lot to control operations of the driveway monitors; and the parking lot central control device also for receiving the parking space monitoring information from the parking space monitors, and for receiving the driveway monitoring information from the driveway monitors in the parking lot; a near end server for bi-directional communication with the at least one parking lot central control device in the parking lot, for providing the first and second control signals to the parking lot central control device, and for receiving the parking space monitoring information from the parking space monitors and the driveway monitoring information from the driveway monitors through the parking lot central control device; and a cloud server module for bi-directional communication with the near end server in the parking lot, for providing the first and second control signals to the near end server, and for receiving the parking space monitoring information from the parking space monitors and the driveway monitoring information from the driveway monitors through the near end server.

Preferably, the parking assistance system according to above, wherein the parking space monitors are mounted above or under the parking spaces correspondingly in the parking lot to monitor the usage statuses of the parking spaces, and wherein the first control signals are used to control monitoring actions of the parking space monitors and control transmission actions of the parking space monitors for transmitting the parking space monitoring information.

Preferably, the parking assistance system according to above, wherein the usage statuses of the parking spaces monitored by the parking space monitors include a private status, an occupied status, an available status, an open for reservation status, a reserved status, an under maintenance status, and an on hold status.

Preferably, the parking assistance system according to above, wherein the driveway monitors are mounted above or under the driveways or above or under spots close to the driveways in the parking lot to monitor soon-to-be locations of the vehicles on the driveways and provide information of movement tracks of the vehicles, and the second control signals are used to control monitoring actions of the driveway monitors and control transmission actions of the driveway monitors for transmitting the driveway monitoring information.

Preferably, the parking assistance system according to above, wherein the driveway monitors are located within areas corresponding to the driveways or within five meters outside the areas corresponding to the driveways in the parking lot, and the number of the driveway monitors being provided depends on an area size one monitor can monitor and on dimensions of the driveways in the parking lot.

Preferably, the parking assistance system according to above, wherein each of the parking lots includes a plurality of parking levels, wherein each of the parking levels has the plurality of parking spaces and the one or more driveways.

Preferably, the parking assistance system according to above, wherein the cloud server module stores history and current usage information of each of the parking lots, and the parking assistance system further includes a prediction unit for obtaining the history and current usage information of each of the parking lots from the cloud server module to predict future usage conditions for each of the parking lots.

Preferably, the parking assistance system according to above, wherein the history and current usage information of each of the parking lots includes parking space usage information at peak hours, parking space usage information at off peak hours, parking space reservation information, and parking space user information including user's history usage patterns, schedules and reservation registration.

Furthermore, the invention is further to provide an information system for bi-directional communication with the parking assistance system according to above, wherein the information system is to select through the cloud server module remotely one of the parking lots managed by the parking assistance system and obtain the parking space monitoring information and the driveway monitoring information of the selected parking lot so as to provide prompts for parking assistance, or wherein the information system is located in one of the parking lots and to obtain through the parking lot central control device or the near end server locally the parking space monitoring information and the driveway monitoring information of the parking lot where the information system is located so as to provide prompts for parking assistance.

Preferably, the information system according to above, wherein the information system is an application program installed in at least one information prompting device, and the information prompting device is an electronic device having a display screen, wherein the information prompting device is a smart phone, an intelligent phone, a tablet computer, a laptop computer, a desktop computer, a cashier, a credit card machine, a projector or a POS machine.

Preferably, the information system according to above, which is for obtaining the future usage conditions of each of the parking lots predicted by the prediction unit of the parking assistance system according to above, so as to indicate the future usage conditions of the selected parking lot and provide parking assistance.

Preferably, the information system according to above, wherein the cloud server module stores first layout information of the driveways and the parking spaces in each of the parking lots, and the near end server stores second layout information of the driveways and the parking spaces in a corresponding one of the parking lots, such that the information prompting device remotely obtains the first layout information of the selected parking lot through the cloud server module to provide parking assistance, or the information prompting device in the parking lot obtains the second layout information through the near end server to provide parking assistance.

Preferably, the information system according to above, wherein each of the parking lots includes a plurality of parking levels, wherein each of the parking levels has a plurality of parking areas, and each of the parking areas has one or more parking spaces; the information prompting device when entering one of the parking levels of the parking lot gives prompts on the basis of parking areas to show whether the parking areas on this parking level have available parking spaces or not, wherein the information prompting device indicates a parking area having at least one available parking space to be in a parking available status and indicates a parking area with no available parking space to be in a parking unavailable status; when the information prompting device approaches or enters one of the parking areas of this parking level in the parking lot, if this parking area has any available parking space, the information prompting device automatically indicates or is selected to show movement dynamics of vehicles on driveways and usage statuses of parking spaces in this parking area so as to provide parking assistance; if this parking area does not have any available parking space, the information prompting device automatically indicates or is selected to show this parking area is in a parking unavailable status.

Preferably, the information system according to above, wherein each of the parking lots includes a plurality of parking levels, wherein each of the parking levels has a plurality of parking areas, and each of the parking areas has one or more parking spaces; the information system selects one of the parking areas of the parking level in the parking lot and indicates the movement dynamics of vehicles on driveways and usage statuses of parking spaces in the selected parking area so as to provide parking assistance.

Preferably, the information system according to above, which uses an information prompting device to distinguish and indicate the parking space monitoring information and the driveway monitoring information of the selected parking lot by means of colors, flashes or shapes.

Preferably, the information system according to above, which uses an information prompting device to obtain vehicle finding information of the parking lot for providing vehicle finding assistance, to make the acceleration of the vehicle departure and then to facilitate the following vehicle parking.

Preferably, the information system according to above, which uses an information prompting device to provide vehicle finding information, wherein the vehicle finding information includes identification numbers of parking spaces where vehicles are parked, vehicle finding paths, and guiding information for vehicle finding provided in a vocal way or shown on a screen.

Preferably, the information system according to above, which indicates the parking space monitoring information, the driveway monitoring information and the vehicle finding information of the parking lot in a vocal way.

In summary, the smart parking assistance system and the information system for bi-directional communication therewith of the invention may simultaneously provide parking space monitoring information and driveway monitoring information in multiple parking lots, such that drivers can be aware whether there are available parking spaces in the parking lots and also know movement dynamics of vehicles in the parking lots, thereby improving accuracy of guiding the drivers to parking spaces, and also preventing vehicles from time-ineffectively running in the parking lots and causing traffic jam. Management efficiency and safety for the parking lots are thus enhanced. Further in the invention, future usage statuses of the parking lots may be predicted and reservation service of parking spaces is provided, such that use efficiency of parking spaces in the parking lots is effectively improved. Moreover, the invention provides vehicle finding service to help the drivers quickly find their vehicles without getting lost in the parking lots.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
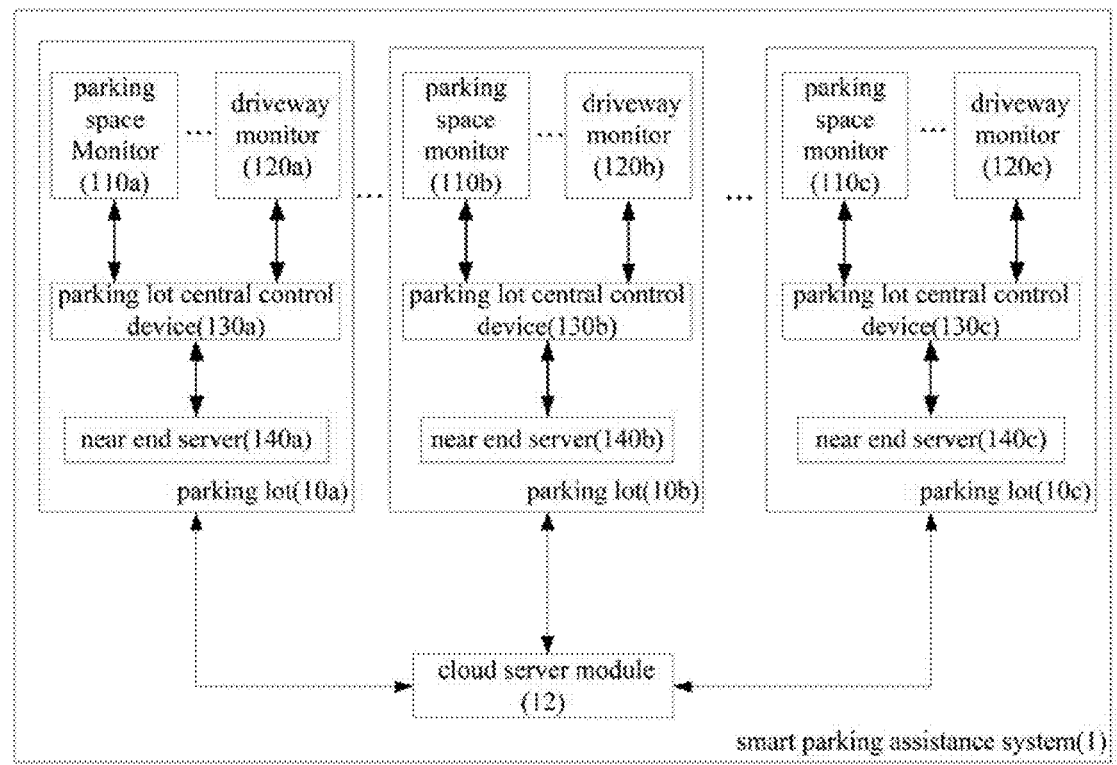
FIG. 1 is a schematic diagram showing a basic architecture of a smart parking assistance system of the invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 6:
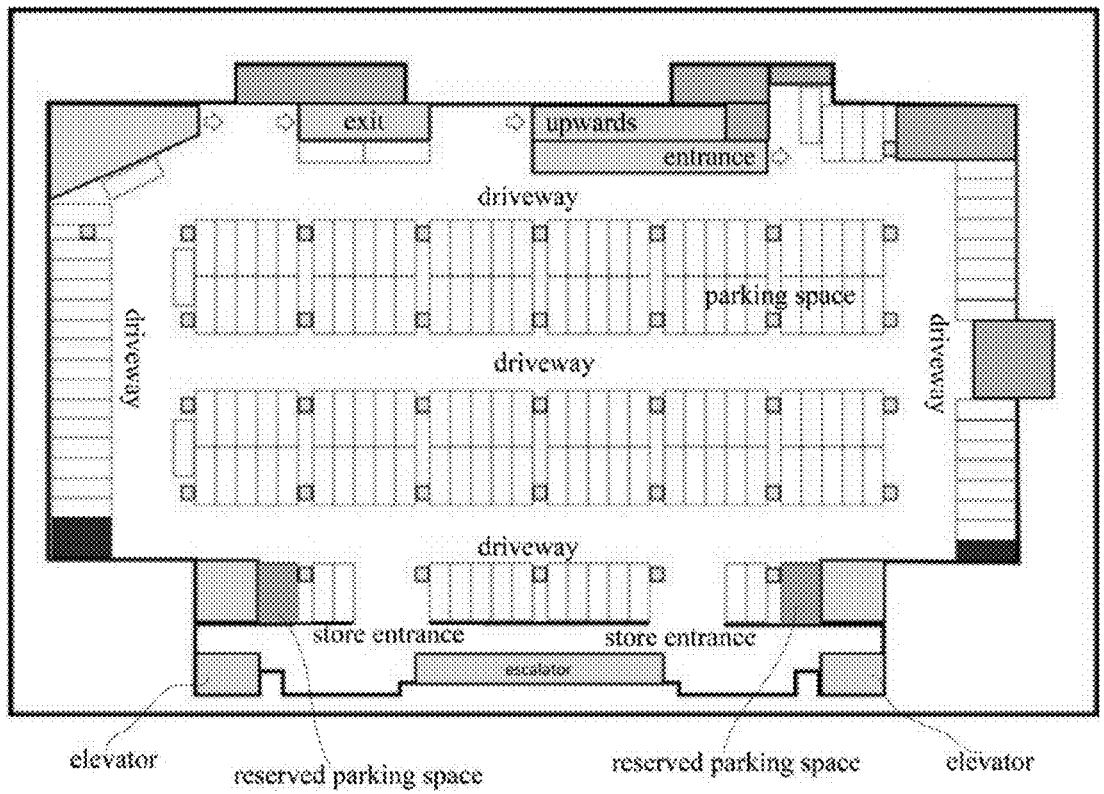
FIG. 6 is a schematic diagram showing an embodiment of a layout of driveways and parking spaces in a parking lot of the invention.

FIG. 1 is a schematic diagram showing a basic architecture of a smart parking assistance system of the invention. As shown in FIG. 1, the smart parking assistance system 1 of the invention may manage a plurality of parking lots 10a, 10b, 10c, wherein each of the parking lots 10a, 10b, 10c has one or more driveways and a plurality of parking spaces (as shown in FIG. 6). In an embodiment, each of the parking lots 10a, 10b, 10c has a plurality of parking levels (not shown), wherein each of the parking levels has a plurality of parking spaces and one or more driveways. As shown in FIG. 1, the parking lot 10a further includes: a plurality of parking space monitors 110a, a plurality of driveway monitors 120a, at least one parking lot central control device 130a, and a near end server 140a. The parking lot 10b further includes: a plurality of parking space monitors 110b, a plurality of driveway monitors 120b, at least one parking lot central control device 130b, and a near end server 140b. The parking lot 10c further includes: a plurality of parking space monitors 110c, a plurality of driveway monitors 120c, at least one parking lot central control device 130c, and a near end server 140c.

The parking space monitors 110a, 110b, 110c are used to monitor a usage status of each of the parking spaces in the parking lots 10a, 10b, 10c respectively, and generate and output parking space monitoring information according to the monitoring results. In this embodiment, the parking space monitors 110a, 110b, 110c are mounted above or under the parking spaces correspondingly in the parking lots 10a, 10b, 10c so as to monitor the usage status of each of the parking spaces. Particularly, the parking space monitors 110a, 110b, 110c may monitor if each of the parking spaces is in a private status, an occupied status, an available status, an open for reservation status, a reserved status, an under maintenance status, or an on hold status.

The driveway monitors 120a, 120b, 120c are used to monitor movement dynamics of vehicles on the driveways in the parking lots 10a, 10b, 10c respectively, and generate and transmit driveway monitoring information according to the monitoring results. In this embodiment, the driveway monitors 120a, 120b, 120c may be mounted above or under the driveways, or above or under some spots close to the driveways, in the parking lots 10a, 10b, 10c correspondingly. Preferably, the driveway monitors 120a, 120b, 120c are located within areas corresponding to the driveways or within 5 meters outside the areas corresponding to the driveways. The respective number of the driveway monitors 120a, 120b, 120c being provided depends on how big area one monitor can monitor and on the dimensions of the driveways. The driveway monitors 120a, 120b, 120c may monitor soon-to-be locations of individual vehicles on the driveways (those are the locations when the vehicles would arrive soon), and figure out movement tracks of the vehicles in the parking lots 10a, 10b, 10c according to the driveway monitoring information being outputted by the driveway monitors 120a, 120b, 120c correspondingly, thus providing the movement track information for the vehicles individually.

The parking lot central control devices 130a, 130b, 130c may have bi-directional communication with the parking space monitors 110a, 110b, 110c and the driveway monitors 120a, 120b, 120c correspondingly in the parking lots 10a, 10b, 10c in a wired or wireless way, so as to transmit first control signals to the parking space monitors 110a, 110b, 110c and accordingly control operations of the parking space monitors 110a, 110b, 110c, and to transmit second control signals to the driveway monitors 120a, 120b, 120c and accordingly control operations of the driveway monitors 120a, 120b, 120c. The parking lot central control devices 130a, 130b, 130c may also receive the parking space monitoring information transmitted from the parking space monitors 110a, 110b, 110c and receive the driveway monitoring information transmitted from the driveway monitors 120a, 120b, 120c in the parking lots 10a, 10b, 10c. The first control signals are used to control monitoring actions of the parking space monitors 110a, 110b, 110c (such as setting of monitoring parameters, for example, monitoring method, monitoring time, monitoring area, monitoring resolution, etc.), and control transmission actions of the parking space monitors 110a, 110b, 110c for transmitting the parking space monitoring information, including: setting the parking space monitors 110a, 110b, 110c to real time transmit the parking space monitoring information, or to periodically transmit the parking space monitoring information according to predetermined time intervals, or to transmit the parking space monitoring information whenever the current status is changed (for example, when a parking space is being monitored to change from an available status to an occupied status, a parking space monitor is out of order or needs maintenance, etc.). The second control signals are used to control monitoring actions of the driveway monitors 120a, 120b, 120c, and control transmission actions of the driveway monitors 120a, 120b, 120c for transmitting the driveway monitoring information. The second control signals are merely different from the first control signals in the targets being controlled, thereby further details not to be repeated here.

Figure 2:
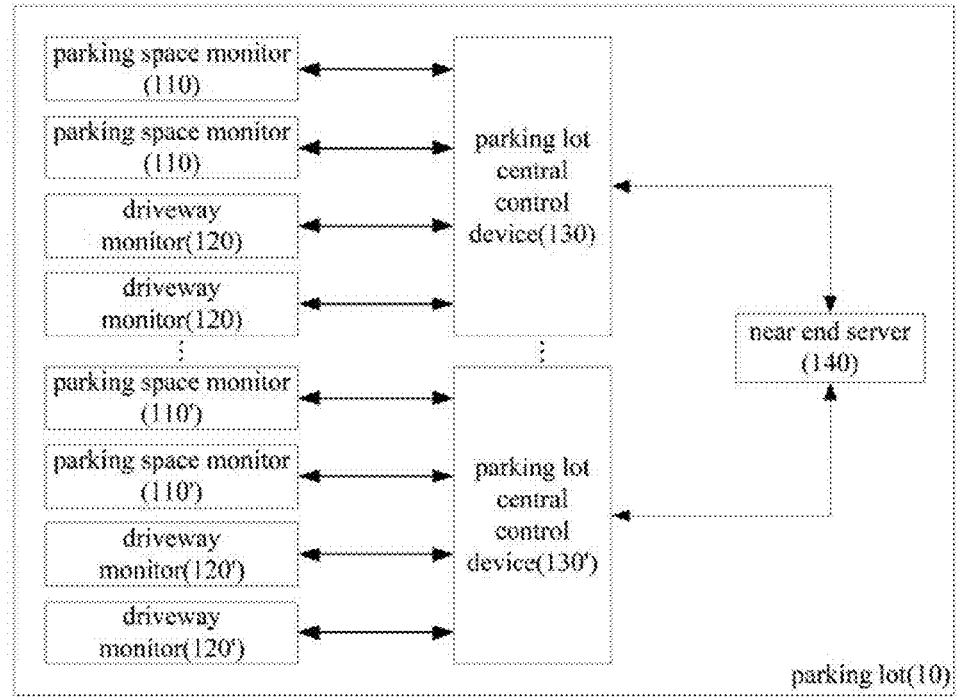
FIG. 2 is a schematic diagram showing an embodiment of a parking lot in the smart parking assistance system of the invention.

Moreover, referring to FIG. 2, in another embodiment of the invention, there may be provided a plurality of parking lot central control devices 130, 130' in one parking lot 10, wherein the parking lot central control device 130 may bi-directionally communicate with a plurality of parking space monitors 110 and a plurality of driveway monitors 120 in the parking lot 10, and the parking lot central control device 130' may bi-directionally communicate with a plurality of parking space monitors 110' and a plurality of driveway monitors 120' in the parking lot 10. The number of the parking lot central control devices 130, 130' being provided depends on the size of the parking lot 10 and the numbers of the parking space monitors 110, 110' and driveway monitors 120, 120' that are mounted in the parking lot 10.

Further referring to FIG. 1, the near end servers 140a, 140b, 140c may bi-directionally communicate with the corresponding parking lot central control devices 130a, 130b, 130c in the parking lots 10a, 10b, 10c. The near end servers 140a, 140b, 140c are used to provide the first and second control signals to the parking lot central control devices 130a, 130b, 130c respectively, and receive the parking space monitoring information from the parking space monitors 110a, 110b, 110c and the driveway monitoring information from the driveway monitors 120a, 120b, 120c through the parking lot central control devices 130a, 130b, 130c respectively.

The smart parking assistance system 1 further includes a cloud server module 12 for bi-directional communication with the near end servers 140a, 140b, 140c in the parking lots 10a, 10b, 10c. The cloud server module 12 is used to provide the first and second control signals to the near end servers 140a, 140b, 140c, and receive the parking space monitoring information from the parking space monitors 110a, 110b, 110c and the driveway monitoring information from the driveway monitors 120a, 120b, 120c through the near end servers 140a, 140b, 140c.

Figure 3:
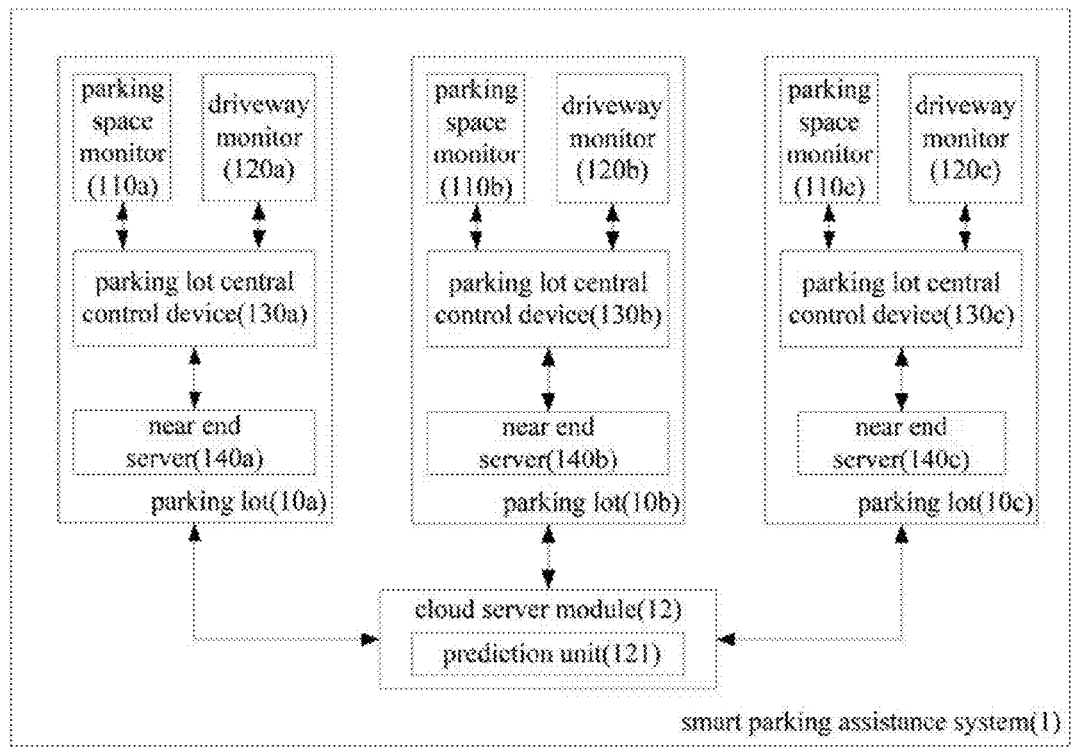
FIG. 3 is a schematic diagram showing an embodiment of the smart parking assistance system of the invention.

Referring to FIG. 3, the cloud server module 12 is further used to store history and current usage information of the parking lots 10a, 10b, 10c. The cloud server module 12 further includes a prediction unit 121 for obtaining the history and current usage information of the parking lots 10a, 10b, 10c through the cloud server module 12, so as to predict future usage conditions for the parking lots 10a, 10b, 10c. Particularly, the history and current usage information of the parking lots 10a, 10b, 10c includes parking space usage information at peak hours, parking space usage information at off peak hours, parking space reservation information, parking space user information such as user's history usage patterns, schedules, reservation registration, and so on, such that parking lot management staff may improve the managing efficiency in accordance with the history and current usage information of the parking lots 10a, 10b, 10c.

Figure 4:
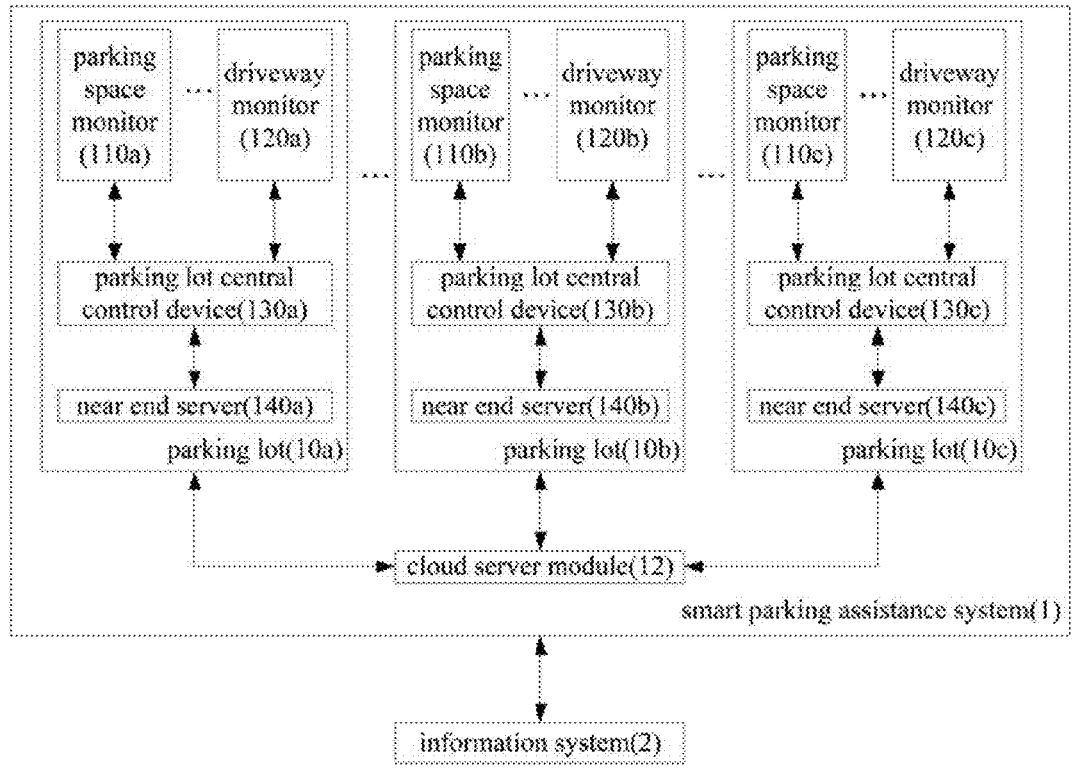
FIG. 4 is a schematic diagram showing a basic architecture of an information system of the invention.

FIG. 4 is a schematic diagram showing a basic architecture of an information system of the invention. As shown in FIG. 4, the information system 2 of the invention bi-directionally communicates with the smart parking assistance system 1. The information system 2 may select one of the parking lots 10a, 10b, 10c, which are managed by the smart parking assistance system 1, through the cloud server module 12 remotely, and thus obtain the parking space monitoring information and the driveway monitoring information of the selected one of the parking lots 10a, 10b, 10c so as to provide prompts and assist drivers to park. Within any one of the parking lots 10a, 10b, 10c, the information system 2 may obtain the parking space monitoring information and the driveway monitoring information of the parking lot 10a/10b/10c (where the information system 2 is located) through the parking lot central control devices 130a, 130b, 130c or the near end servers 140a, 140b, 140c locally, so as to provide prompts and assist drivers to park.

Figure 5:
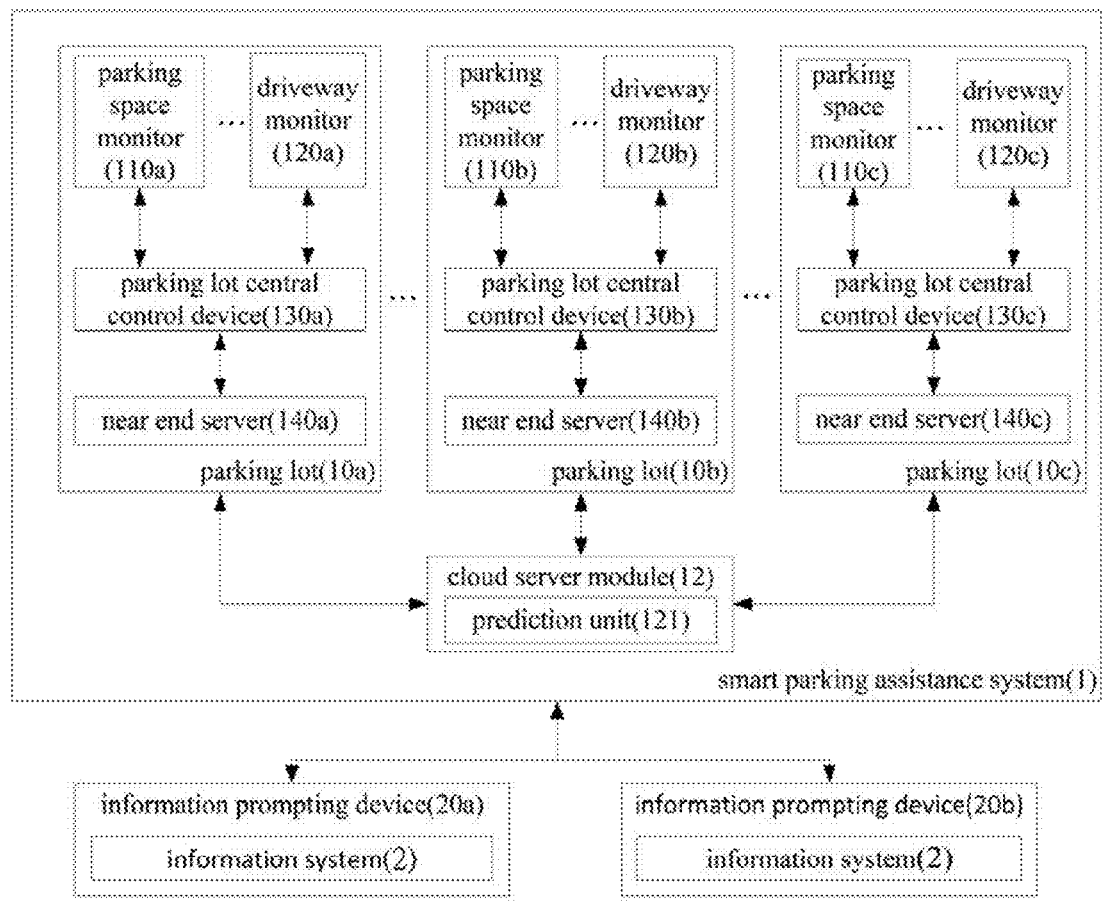
FIG. 5 is a schematic diagram showing an embodiment of the information system of the invention.

Referring to FIG. 5, the information system 2 includes an application program (APP) installed in at least one information prompting device 20a, 20b, and is applicable to various operating systems such as IOS system, Android system and so on. The information prompting device 20a, 20b is an electronic device having a display screen, and preferably is a smart phone, intelligent phone or tablet computer, so as to provide parking assistance information for the drivers, help them quickly find available parking spaces, and provide accurate parking space guiding service for the drivers, thereby eliminating difficulty in parking in the city. Moreover, the information prompting device 20a, 20b may also be a laptop computer, desktop computer, cashier, credit card machine, projector or POS machine. The related staff of the parking lots 10a, 10b, 10c may obtain the parking space monitoring information and the driveway monitoring information of the parking lots 10a, 10b, 10c through the information prompting device 20a, 20b in order to improve managing efficiency of the parking lots.

The information system 2 of the invention may further obtain the future usage conditions of the parking lots 10a, 10b, 10c predicted by the prediction unit 121 of the smart parking assistance system 1, so as to give the selected parking lot 10a/10b/10c a prompt of future usage condition and facilitate parking in the parking lot 10a/10b/10c. More details are depicted as above for the prediction unit 121.

Figure 7:
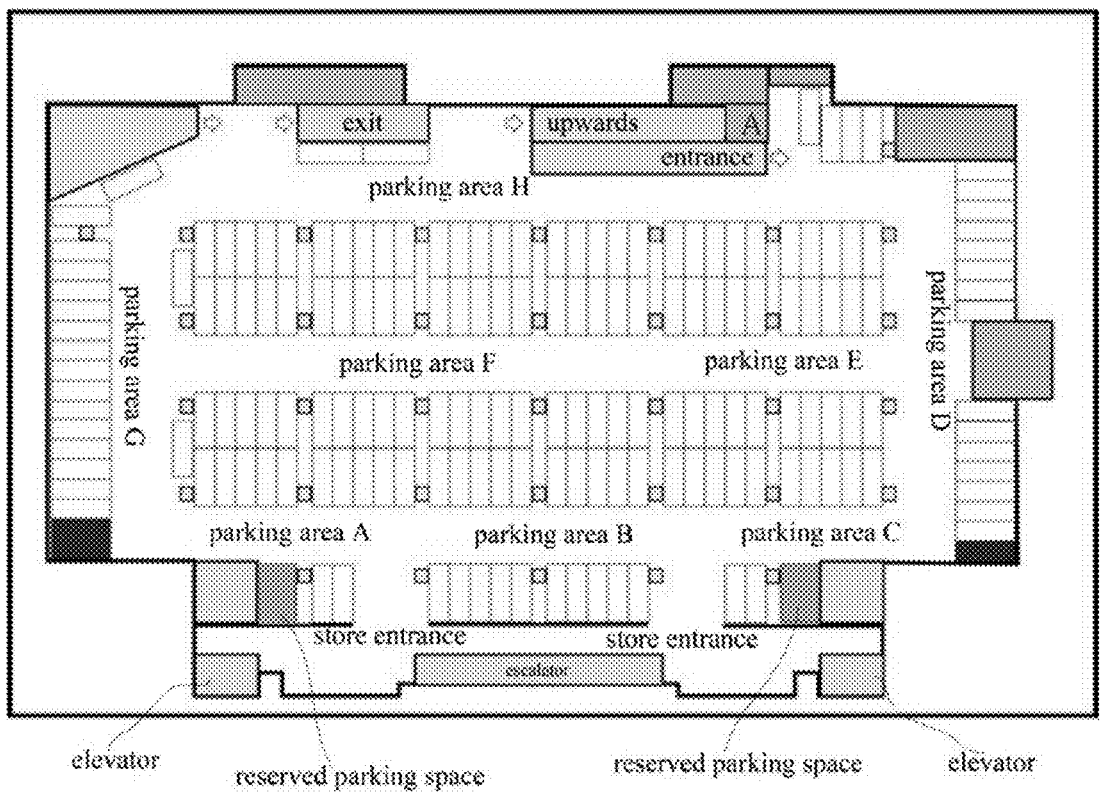
FIG. 7 is a schematic diagram showing an embodiment of a layout of parking areas in the parking lot of the invention.

The cloud server module 12 also stores first layout information of driveways and parking spaces in the parking lots 10a, 10b, 10c managed by the smart parking assistance system 1 (that is, structure maps of the parking lots 10a, 10b, 10c). The near end server 140a merely stores second layout information of driveways and parking spaces in the corresponding parking lot 10*a* (that is, the structure map of the parking lot 10*a*, which shows the layout of driveways and parking spaces of the parking lot 10*a*). Similarly, the near end server 140*b* stores second layout information of driveways and parking spaces in the corresponding parking lot 10*b* (that is, the structure map of the parking lot 10*b*, which shows the layout of driveways and parking spaces of the parking lot 10*b*). The near end server 140*c* stores second layout information of driveways and parking spaces in the corresponding parking lot 10*c* (that is, the structure map of the parking lot 10*c*, which shows the layout of driveways and parking spaces of the parking lot 10*c*). This allows a driver who has not entered or been close to a parking lot to communicate remotely with the cloud server module 12 via the information prompting device 20*a*, and select one of the parking lots managed by the cloud server module 12 (for example, parking lot 10*a*) and obtain the first layout information of the parking lot 10*a* (that is, the structure map of the parking lot 10*a* as shown in FIG. 7) for parking assistance. Alternatively, when a driver enters a parking lot (for example, parking lot 10*b*), he/she may communicate with the near end server 140*b* via the information prompting device 20*a* to obtain the second layout information of the parking lot 10*b* (that is, the structure map of the parking lot 10*b*) for parking assistance.

Figure 8A:
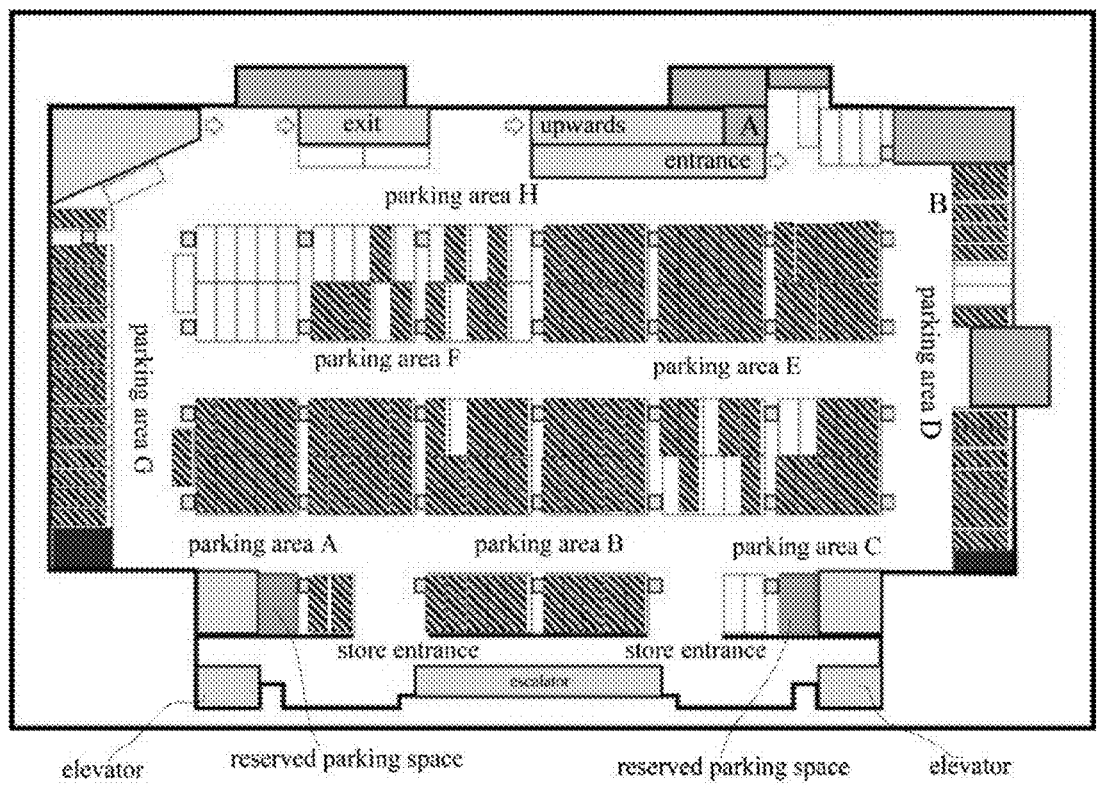
FIG. 8A is a schematic diagram showing an embodiment of a usage status of parking spaces in the parking lot of the invention.
Figure 8B:
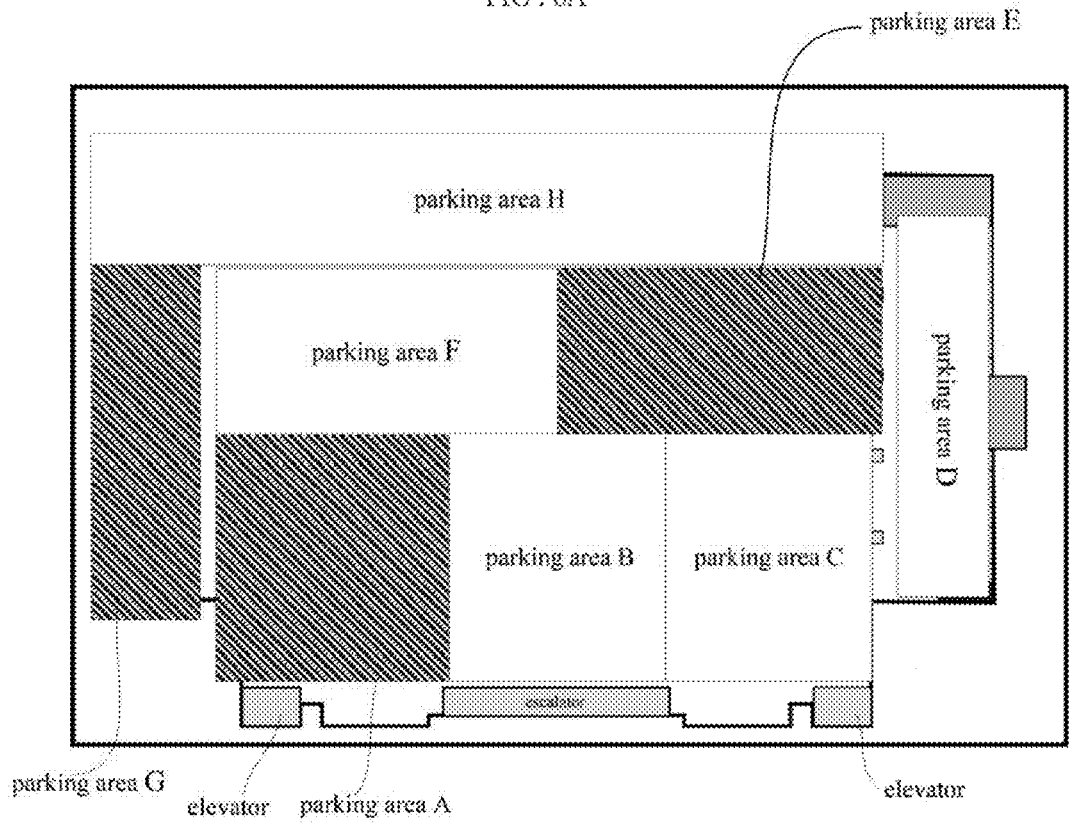
FIG. 8B is a schematic diagram showing locations of available parking spaces in the parking lot by indicating available parking areas through the use of the information system of the invention.

Referring to FIG. 7, the information system 2 of the invention may provide graded information prompting functions. Particularly, each of the parking lots 10*a*, 10*b*, 10*c* has multiple parking levels (not shown), and each of the parking levels has multiple parking areas. As shown in a structural diagram of parking areas of FIG. 7, one parking level in the parking lot shown in FIG. 7 is divided into a plurality of parking areas, that is, parking areas A to H, wherein each of the parking areas includes one or more parking spaces. Referring to FIGS. 8A and 8B, when a driver enters one of the parking levels of the parking lot, for example, the driver reaches position A at the entrance of the parking level in FIG. 8A, the information prompting device 20*a* would give prompts on the basis of parking areas to inform the driver whether the parking areas on the current parking level have available parking spaces or not, as shown in FIG. 8B. Particularly, the information prompting device 20*a* would indicate a parking area having at least one available parking space to be in a parking available status; that is, as long as a parking area has any available parking space, the whole parking area would be indicated as being available for parking, such as parking area B in FIG. 8B. The information prompting device 20*a* would indicate a parking area with no available parking space to be in a parking unavailable status, such that parking areas E and G in FIG. 8B. In the invention, when the driver enters a parking level of a parking lot, he/she would be informed in a macro way of what directions having parking areas with available parking spaces and can thus be quickly guided to those parking areas. Then, when the information prompting device 20*a* approaches or enters a parking area of the parking level in the parking lot, if this parking area has any available parking space, the information prompting device 20*a* would automatically indicate or be selected to show movement dynamics of vehicles on driveways and usage statuses of parking spaces in this parking area so as to facilitate the driver to park; if this parking area does not have any available parking space, the information prompting device 20*a* would automatically indicate or be selected to show this parking area is in a parking unavailable status. Particularly, when the driver drives to position B on the parking level, that is, approaching or entering parking area D, since parking area D has at least one available parking space, the information prompting device 20 would in a micro way automatically indicate or be selected to show movement dynamics of vehicles on driveways and usage statuses of parking spaces in parking area D, such that the driver may know parking area D currently has two available parking spaces according to the usage statuses of parking spaces, and then realize how many vehicles currently running in parking area D according to the movement dynamics of vehicles on driveways. For example, if there are two or more vehicles currently running in parking area D, it is predictable the two or more vehicles may compete for the two available parking spaces in parking area D. In this case, the driver may decide to leave parking area D to find other parking areas available for parking, such that traffic jam can be effectively prevented in packing area D and accuracy for guiding drivers to available parking spaces is improved. Moreover, when the driver drives into parking area E, the information prompting device 20*a* would automatically indicate parking area E has no available parking space, so the driver may directly leave parking area E instead of wasting time driving in this parking area. Especially for a large parking lot, such two stage macro and micro ways of indicating related parking prompting information allow the information prompting device to show a direction where available parking spaces are located and then show positions of the available parking spaces and movement dynamics of surrounding vehicles, so as to more efficiently assist drivers to park, effectively manage vehicles running in the parking lot, and make vehicle parking quickly done.

In another embodiment of the invention, the information system 2 may select one of the parking areas on the parking level of the parking lot and indicate the movement dynamics of vehicles on driveways and the usage statuses of parking spaces in the selected parking area to assist the driver to park. Particularly, before a driver enters the parking lot 10 or any parking level of the parking lot 10, he/she may select a parking area on a parking level of the parking lot 10, and have the information system 2 show current movement dynamics of vehicles on driveways and usage statuses of parking spaces in the selected parking area. For example, if the driver selects parking area E and knows there is no available parking space in parking area E through the information prompting device 20, he/she may continuously browse and select another parking area. If the driver selects parking area D and knows there are two available parking spaces in parking area D through the information prompting device 20, but there are currently three vehicles running on driveways of parking area D, which means these vehicles may compete for the two available parking spaces in parking area D, the driver then may continuously browse and select another parking area. Therefore, the invention allows drivers to manually browse and select related parking prompting information to know well the monitoring information about parking spaces and driveways of parking areas in parking lots, so as to help the drivers more efficiently find available parking spaces and successfully park. It should be noted that, in the embodiments of the invention, the information prompting device may use colors (for example, red for having no available parking space, green for having an available parking space), flashes (for example, flashing for a reserved parking space or for a running vehicle on a driveway), or shapes, to distinguish and indicate the parking space monitoring information and the driveway monitoring information of the selected parking lot.

The information system 2 of the invention further may obtain vehicle finding information from the smart parking assistance system 1 to facilitate vehicle finding. More particularly, the smart parking assistance system 1 of the invention further may record specific parking locations of vehicles (locations of their parking spaces) to help drivers to find their vehicles when needed. The vehicle finding information may include identification numbers of parking spaces where vehicles are parked, vehicle finding paths, and guiding information for vehicle finding provided in a vocal way or shown on a screen. Besides for the vehicle finding information, the vocal way is also applicable to indicating the parking space monitoring information and the driveway monitoring information of the parking lot.

Therefore, by the smart parking assistance system and an information system for bi-directional communication therewith in the invention, parking space monitors and driveway monitors are provided in parking lots to monitor usage statuses of parking spaces and movement dynamics of vehicles on driveways in the parking lots, and output parking space monitoring information and driveway monitoring information. Operations of the parking space monitors and the driveway monitors can be controlled by inputted first and second control signals. This allows the parking lots to be managed and monitored according to users' requirements. Further, the smart parking assistance system of the invention may bi-directionally communicate with the information system, thereby more accurately assisting drivers to park and to find available parking spaces quickly instead of wasting time driving and searching in the parking lots. This may effectively manage vehicle running and safety in the parking lots, reduce gas exhaust and carbon monoxide emission, and thus improve the air and environment in the parking lots. Moreover, the information system of the invention uses a multi-stage way of indicating parking assistance information on the basis of different units (the based units include parking area/parking space, and driveway), such that the drivers may have more flexibility and efficiency to get the parking assistance information. The invention also may predict future usage conditions of the parking lots, provide reservation service for parking spaces, and thus further improve the management efficiency of the parking lots.

The examples above are only illustrative to explain principles and effects of the invention, but not to limit the invention. It will be apparent to those skilled in the art that modifications and variations can be made without departing from the scope of the invention. Therefore, the protection range of the rights of the invention should be as defined by the appended claims.

What is claimed is:

1. A parking assistance system applicable in a plurality of parking lots, each of the parking lots having one or more driveways and a plurality of parking spaces, for each of the parking lots the parking assistance system including:
   a plurality of parking space monitors for respectively monitoring usage statuses of the parking spaces in the parking lot, and generating and outputting parking space monitoring information according to the monitored usage statuses of the parking spaces;
   a plurality of driveway monitors for respectively monitoring movement dynamics of vehicles on the driveways in the parking lot, and generating and outputting driveway monitoring information according to the monitored movement dynamics of vehicles;
   at least one parking lot central control device for bi-directional communication with the parking space monitors and the driveway monitors in the parking lot in a wired or wireless way, for transmitting first control signals to the parking space monitors in the parking lot to control operations of the parking space monitors, and for transmitting second control signals to the driveway monitors in the parking lot to control operations of the driveway monitors; and the parking lot central control device also for receiving the parking space monitoring information from the parking space monitors, and for receiving the driveway monitoring information from the driveway monitors in the parking lot;
   a near end server for bi-directional communication with the at least one parking lot central control device in the parking lot, for providing the first and second control signals to the parking lot central control device, and for receiving the parking space monitoring information from the parking space monitors and the driveway monitoring information from the driveway monitors through the parking lot central control device; and
   a cloud server module for bi-directional communication with the near end server in the parking lot, for providing the first and second control signals to the near end server, and for receiving the parking space monitoring information from the parking space monitors and the driveway monitoring information from the driveway monitors through the near end server.

2. The parking assistance system according to claim 1, wherein the parking space monitors are mounted above or under the parking spaces correspondingly in the parking lot to monitor the usage statuses of the parking spaces, and wherein the first control signals are used to control monitoring actions of the parking space monitors and control transmission actions of the parking space monitors for transmitting the parking space monitoring information.

3. The parking assistance system according to claim 1, wherein the usage statuses of the parking spaces monitored by the parking space monitors include a private status, an occupied status, an available status, an open for reservation status, a reserved status, an under maintenance status, and an on hold status.

4. The parking assistance system according to claim 1, wherein the driveway monitors are mounted above or under the driveways or above or under spots close to the driveways in the parking lot to monitor soon-to-be locations of the vehicles on the driveways and provide information of movement tracks of the vehicles, and the second control signals are used to control monitoring actions of the driveway monitors and control transmission actions of the driveway monitors for transmitting the driveway monitoring information; wherein the driveway monitors are located within areas corresponding to the driveways or within five meters outside the areas corresponding to the driveways in the parking lot, and the number of the driveway monitors being provided depends on an area size one monitor can monitor and on dimensions of the driveways in the parking lot.

5. The parking assistance system according to claim 1, wherein each of the parking lots includes a plurality of parking levels, wherein each of the parking levels has the plurality of parking spaces and the one or more driveways.

6. The parking assistance system according to claim 1, wherein the cloud server module stores history and current usage information of each of the parking lots, and the parking assistance system further includes a prediction unit for obtaining the history and current usage information of each of the parking lots from the cloud server module to predict future usage conditions for each of the parking lots, wherein the history and current usage information of each of the parking lots includes parking space usage information at peak hours, parking space usage information at off peak hours, parking space reservation information, and parking space user information including user's history usage patterns, schedules and reservation registration.

7. An information system for bi-directional communication with the parking assistance system according to claim 1, wherein the information system is to select through the cloud server module remotely one of the parking lots managed by the parking assistance system and obtain the parking space monitoring information and the driveway monitoring information of the selected parking lot so as to provide prompts for parking assistance, or wherein the information system is located in one of the parking lots and to obtain through the parking lot central control device or the near end server locally the parking space monitoring information and the driveway monitoring information of the parking lot where the information system is located so as to provide prompts for parking assistance.

8. The information system according to claim 7, which is for obtaining the future usage conditions of each of the parking lots predicted by the prediction unit of the parking assistance system according to claim 6, so as to indicate the future usage conditions of the selected parking lot and provide parking assistance.

9. The information system according to claim 7, wherein each of the parking lots includes a plurality of parking levels, wherein each of the parking levels has a plurality of parking areas, and each of the parking areas has one or more parking spaces; the information system selects one of the parking areas of the parking level in the parking lot and indicates the movement dynamics of vehicles on driveways and usage statuses of parking spaces in the selected parking area so as to provide parking assistance.

10. The information system according to claim 7, which uses an information prompting device to distinguish and indicate the parking space monitoring information and the driveway monitoring information of the selected parking lot by means of colors, flashes or shapes.

11. The information system according to claim 7, which obtains vehicle finding information of the parking lot and uses an information prompting device to indicate the parking space monitoring information, the driveway monitoring information and the vehicle finding information of the parking lot in a vocal way.

12. The information system according to claim 7, which obtains vehicle finding information of the parking lot through an information prompting device so as to provide vehicle finding assistance, wherein the vehicle finding information includes identification numbers of parking spaces where vehicles are parked, vehicle finding paths, and guiding information for vehicle finding provided in a vocal way or shown on a screen.

13. The information system according to claim 7, wherein the information system is an application program installed in at least one information prompting device, and the information prompting device is an electronic device having a display screen.

14. The information system according to claim 13, wherein the information prompting device is a smart phone, an intelligent phone, a tablet computer, a laptop computer, a desktop computer, a cashier, a credit card machine, a projector or a POS machine.

15. The information system according to claim 13, wherein the cloud server module stores first layout information of the driveways and the parking spaces in each of the parking lots, and the near end server stores second layout information of the driveways and the parking spaces in a corresponding one of the parking lots, such that the information prompting device remotely obtains the first layout information of the selected parking lot through the cloud server module to provide parking assistance, or the information prompting device in the parking lot obtains the second layout information through the near end server to provide parking assistance.

16. The information system according to claim 13, wherein each of the parking lots includes a plurality of parking levels, wherein each of the parking levels has a plurality of parking areas, and each of the parking areas has one or more parking spaces; the information prompting device when entering one of the parking levels of the parking lot gives prompts on the basis of parking areas to show whether the parking areas on this parking level have available parking spaces or not, wherein the information prompting device indicates a parking area having at least one available parking space to be in a parking available status and indicates a parking area with no available parking space to be in a parking unavailable status; when the information prompting device approaches or enters one of the parking areas of this parking level in the parking lot, if this parking area has any available parking space, the information prompting device automatically indicates or is selected to show movement dynamics of vehicles on driveways and usage statuses of parking spaces in this parking area so as to provide parking assistance; if this parking area does not have any available parking space, the information prompting device automatically indicates or is selected to show this parking area is in a parking unavailable status.

\* \* \* \* \*